(12) United States Patent
Vorobyov et al.

(10) Patent No.: US 10,890,448 B2
(45) Date of Patent: Jan. 12, 2021

(54) GYROCOPE BASED ON NITROGEN VACANCY CENTERS IN DIAMOND

(71) Applicant: LIMITED LIABILITY COMPANY "SENSOR SPIN TECHNOLOGIES", Moscow (RU)

(72) Inventors: Vadim Vladislavovich Vorobyov, Moscow (RU); Vladimir Vladimirovich Soshenko, Dolgoprudny (RU); Stepan Viktorovich Bolshedvorskii, Angarsk (RU); Alexey Vladimirovich Akimov, Moscow (RU); Andrey Nikolaevich Smolyaninov, Moscow (RU)

(73) Assignee: Q-Sensorix LLC, Austin, TX (US)

( * ) Notice: Subject to any disclaimer, the term of this patent is extended or adjusted under 35 U.S.C. 154(b) by 69 days.

(21) Appl. No.: 16/347,811

(22) PCT Filed: Apr. 24, 2017

(86) PCT No.: PCT/RU2017/050029
§ 371 (c)(1),
(2) Date: May 7, 2019

(87) PCT Pub. No.: WO2018/097764
PCT Pub. Date: May 31, 2018

(65) Prior Publication Data
US 2019/0293425 A1 Sep. 26, 2019

(30) Foreign Application Priority Data
Apr. 24, 2017 (RU) .............................. 20161168860

(51) Int. Cl.
*G01C 19/62* (2006.01)
*G01C 19/04* (2006.01)

(52) U.S. Cl.
CPC ............. *G01C 19/62* (2013.01); *G01C 19/04* (2013.01)

(58) Field of Classification Search
CPC ................................ G01C 19/04; G01C 19/62
See application file for complete search history.

(56) References Cited

U.S. PATENT DOCUMENTS 8,669,764 B2 * 3/2014 Twitchen .......... B01L 3/502707
324/321
8,686,377 B2 * 4/2014 Twitchen ................ C30B 29/04
250/492.1

(Continued)

*Primary Examiner* — Dixomara Vargas
(74) *Attorney, Agent, or Firm* — Nadya Reingand; Yan Hankin

(57) ABSTRACT

The invention pertains to the field of gyroscopes, in particular—to quantum gyroscopes. The invention provides a gyroscope employing an ensemble of NV-centers in diamond, which includes a diamond plate, a source of green light, an optical system for directing the green light to the diamond plate, a photodetector for registering fluorescence of the color centers in the diamond plate, optical elements that direct the fluorescence from the diamond plate to the photodetector, a source of microwave radiation, a source of radiofrequency radiation, and a source of constant magnetic field, the gyroscope being different from the prior art in that it comprises an energy-efficient antenna that creates a strong longitudinal homogeneous field in the entire volume of the diamond plate with the possibility of frequency adjustment, as well as a system for locking the frequency of the microwave field to that of the transition in the color centers. The invention allows to reduce the volume of the sensing element, provides high relative spectral sensitivity, and allows to create a hybrid device that comprises a 3-axis gyroscope, a magnetometer, and a temperature sensor.

11 Claims, 9 Drawing Sheets

(56) References Cited

U.S. PATENT DOCUMENTS

| | | | | |
|---|---|---|---|---|
| 8,758,509 B2* | 6/2014 | Twitchen | ................ | C30B 29/04 |
| | | | | 117/86 |
| 9,222,887 B2* | 12/2015 | Englund | ............ | G01N 21/6428 |
| 9,335,606 B2* | 5/2016 | Hanson | .................... | G02B 6/00 |
| 9,541,610 B2* | 1/2017 | Kaup | .................... | G01R 33/032 |
| 9,551,763 B1* | 1/2017 | Hahn | ................ | G01R 33/0017 |
| 9,720,055 B1* | 8/2017 | Hahn | ................ | G01R 33/0094 |
| 9,817,081 B2* | 11/2017 | Hahn | ................ | G01R 33/0094 |
| 9,823,314 B2* | 11/2017 | Hahn | ................ | G01R 33/0017 |
| 9,910,104 B2* | 3/2018 | Boesch | ................ | G05D 1/0088 |
| 9,910,105 B2* | 3/2018 | Boesch | ................ | G05D 1/0088 |
| 10,006,973 B2* | 6/2018 | Hahn | ................ | G01R 33/0017 |
| 10,088,336 B2* | 10/2018 | Fisk | ........................ | G01V 1/186 |
| 10,088,452 B2* | 10/2018 | Villani, Jr. | ............. | G01N 27/82 |
| 10,126,377 B2* | 11/2018 | Hahn | .................... | G01N 21/64 |
| 10,168,393 B2* | 1/2019 | Stetson, Jr. | ........ | G01R 33/0052 |
| 10,228,429 B2* | 3/2019 | Bruce | .................... | G01R 33/032 |
| 10,241,158 B2* | 3/2019 | Manickam | ........... | G01R 33/032 |
| 10,274,550 B2* | 4/2019 | Bruce | .................... | G01R 33/26 |
| 10,338,162 B2* | 7/2019 | Reynolds | ............ | G01R 33/26 |
| 10,408,889 B2* | 9/2019 | Kaup | .................... | G01R 33/032 |
| 10,459,041 B2* | 10/2019 | Hahn | .................. | G01R 33/032 |
| 10,520,558 B2* | 12/2019 | Hahn | .................. | G01R 33/032 |
| 10,677,953 B2* | 6/2020 | Stetson | ................ | G01V 3/101 |
| 10,725,124 B2* | 7/2020 | Boesch | ................ | G01C 21/00 |
| 2014/0035584 A1* | 2/2014 | Twitchen | .......... | B01L 3/502715 |
| | | | | 324/321 |
| 2014/0061510 A1* | 3/2014 | Twitchen | ................ | C30B 29/04 |
| | | | | 250/492.1 |
| 2014/0077231 A1* | 3/2014 | Twitchen | ............. | H01L 29/167 |
| | | | | 257/77 |
| 2016/0054402 A1* | 2/2016 | Meriles | ................ | G01R 33/302 |
| | | | | 324/309 |

* cited by examiner

GYROCOPE BASED ON NITROGEN VACANCY CENTERS IN DIAMOND

BACKGROUND OF THE INVENTION

The invention pertains to the field of gyroscopes, in particular—to quantum gyroscopes.

From the prior art, micro-NMR gyroscope comprising a noble gas as the sensitive element is known, as described in patents US20110297372, WO2006069116, U.S. Pat. No. 7,282,910, US20070266784. Its operation measuring the corresponding Larmor precession frequency variation as dependent on the rotation rate. A measurement of the precession speed ωL for an atom placed in a constant magnetic field can be used to determine the rotation speed of the device. This gyroscope, comparable in size to MEMS gyroscopes, delivers the performance similar to that of fiber-optics gyroscopes, and is classified as tactical. The main drawbacks of this gyroscope are the long start up time (~100 s), and the complexity and high cost (on the order of US$ 100 K) of manufacturing. According to DARPA, the gyroscopes based on this principle will gain wide use not earlier than towards 2030.

The NMR gyroscopes, that use the spins of NV color centers in diamond as the sensitive element (described in patents US20140327439, US20150090033, CN 201310565956, CN 201310752272) instead of a gas, are the closest analogues of the present invention.

The key properties of the prior devices are shown in the table below:

| Characteristic volume, $mm^3$ | Spectral noise density, $deg/\sqrt{hour}$ | Initialization time, ms |
|---|---|---|
| $10^3$ | $10^{-3}$ | $10^5$ |

This invention uses as a prototype the spin gyroscope based on NV centers in diamond provided in the patent US20140327439A1, where radiofrequency coils and coplanar microwave waveguides on a diamond structure were utilized to improve sensitivity and stability of a three-axis gyroscope.

SUMMARY OF THE INVENTION

The problem addressed by this invention is measuring absolute rotation of a sensitive element of the sensor. A solution provided by the invention delivers the following results:
Reducing volume of the sensor: less than 1 $cm^3$;
High spectral sensitivity: $0.3 \cdot 10^{-3} deg/\sqrt{hour}$;
Low bias drift: $\sim 10^{-3} deg/hour$;
A possibility of producing a hybrid device incorporating a 3-axis gyroscope, a magnetometer, and a thermometer.

To achieve a solution to the above problem, a gyroscope based on NV-centers in a diamond, comprising a diamond plate, a source of a green light, an optical system for directing the green light onto the diamond plate, a photodetector for registering fluorescence of the NV-centers in the diamond plate, optical elements directing the fluorescence from the diamond plate to the photodetector, a source of super-high-frequency radiation, a source of radio frequency radiation, and a source of constant magnetic field, wherein the gyroscope additionally comprises an energy-efficient antenna for microwaves that creates a strong longitudinal homogeneous microwave field in the entire volume of the diamond, is configured to provide a frequency adjustment of said microwave field, and configured to have a system for coupling the frequency of said microwave field to a frequency of the transition in the NV centers.

The gyroscope may be implemented in such a way that the diamond plate contains the NV centers at a concentration within the range of 1-100 ppm, while the concentration of nitrogen is not higher than 5 times that of the NV centers, and the concentration of other impurities is lower than 1 ppm.

The gyroscope may be constructed to comprise a source of green light of a laser or a photodiode type with the wavelength in the range from 500 to 580 nm and the power higher than 0.1 W; an optical system to direct the green light into the diamond plate and to produce the pumping power density exceeding 10 $W/mm^2$; a photodetector with the bandwidth above 6 MHz, the signal-to-noise ratio of more than 60 dB, and the operating wavelength of 600-800 nm to detect fluorescence from the color centers; and an optical system to direct the NV centers fluorescence from the diamond plate to the photodetector.

The gyroscope may comprise a source of microwave radiation with the frequency range of 2.6-3 GHz modulated in frequency and amplitude, and an antenna to create a microwave field with the amplitude greater than 0.3 G along the diamond plate surface and the homogeneity exceeding 90%.

The gyroscope may comprise a source of radiofrequency radiation with the frequency of up to 10 MHz.

The gyroscope may comprise a source of constant magnetic field with the strength of up to 20 G and the temperature stability higher than 1 deg./hour.

The gyroscope may comprise a control system providing signal sequences to drive the microwave, the radiofrequency, and the optical pumping sources as well as to provide frequency modulation and a feedback loop for eliminating externally induced unwanted components in the signal.

The gyroscope may comprise optical elements providing the fluorescence collection efficiency of more than 50%.

As another aspect of the invention, a rotation measurement method is provided that uses the quantum sensor with the diamond plate containing an ensemble of NV centers and comprises the following steps:

Bringing the system of NV centers and the surrounding nuclear spins into a state sensitive to rotation through a number N>1 of cycles of gradual population transfer from the states with the nuclear spin projection $m_I=1, -1$ to those with $m_I=0$, where each cycle includes the following pulse sequence:
an optical pulse with the duration of 300-1500 ns to put the system into the state with $m_s=0$ and a uniform distribution among the nuclear substates with $m_I=1, -1$, and 0,
a microwave it-pulse to transfer the system from the state with $m_s=0$, $m_I=1$ to the state with $m_s=+1$, $m_I=1$,
a radiofrequency it-pulse to transfer the system from the state with $m_s=+1$, $m_I=1$ to the state with $m_s=+1$, $m_I=0$,
an optical pulse with the duration of 300-1500 ns and the wavelength equal to 532 nm of non-coherent excitation that preserves the nuclear spin states in the presence of an axial external magnetic field and transfers the system into the state with $m_s=0$, $m_I=1$,
repeating the steps ii-iv for the system with the state $m_s=0$, $m_I=-1$
repeating steps ii-v N times, where N lies within the range 1-5000.

Controlling the system while in operation, including the use of radiofrequency pulses to eliminate external noise, and reducing the impact of temperature and external magnetic field by means of conducting the measurements on the |−1> and |1> transitions of the electronic spin and measuring the magnetic field with help of the diamond plate;

Reading out the rotation data through measuring the accumulated Berry phase, using the following sequence:

application of a radiofrequency π/2-pulse with the frequency detuned from that of the hyperfine splitting by dF*, measurement of the nuclear spin state by running a CNOT gate on the system "electronic spin-nuclear spin" with, for example, a microwave π-pulse at the frequency detuned by that of the hyperfine splitting from the electron resonance frequency, fluorescence intensity response measurement.

With the described method, the rotation angle, as dependent on the magnitude of the response, is determined by the expression S(w)=1+Rcos (A*F(Th)), where F is a function of the angle between the rotation axis and the NV center axis, and is either a sine or a cosine function, depending on the measurement details.

DETAILED DESCRIPTION OF THE INVENTION

Figure 1:
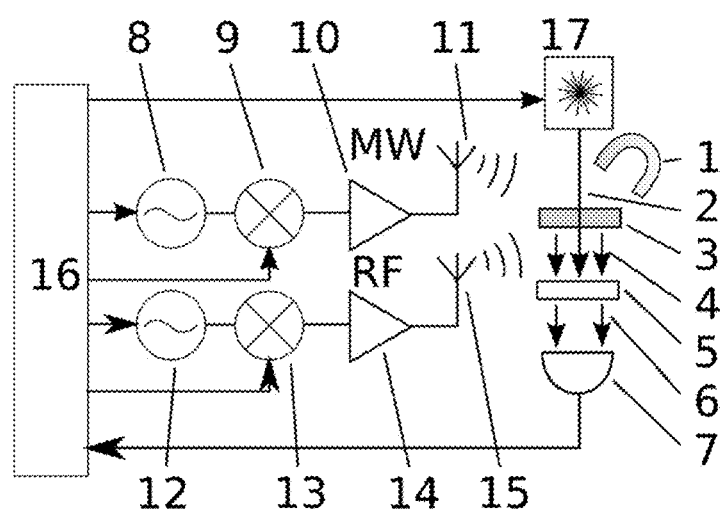
FIG. 1 presents a schematic diagram of the invention, with the following notation:
1. A permanent magnet or a system thereof creating a magnetic field along the NV center axis
2. Optical pumping radiation
3. A diamond plate implanted with NV centers
4. Optical pumping radiation combined with the fluorescence of the NV centers
5. An optical filter to cut off the pumping radiation
6. The NV centers fluorescence
7. A photodetector
8. A controllable sine-signal source with the frequency 2-3 GHz (the microwave range)
9. A microwave amplitude modulator
10. A microwave amplifier
11. A microwave antenna
12. A controllable source of sine signal with the frequency range of 1-50 MHz (the radiofrequency range)
13. A radiofrequency amplitude modulator
14. A radiofrequency amplifier
15. A radiofrequency antenna
16. A device for signal generation, acquisition, and processing
17. A modulated source of optical pumping
Figure 2:
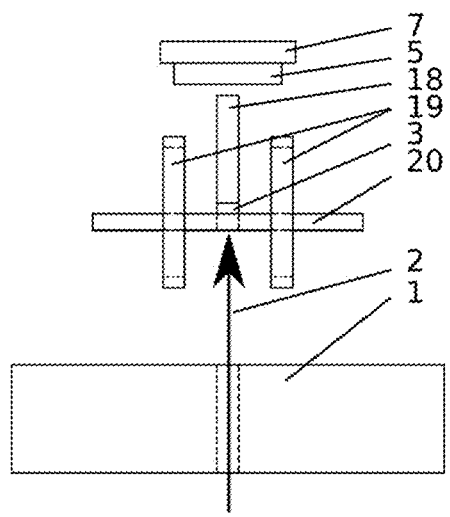
FIGS. 2 and 3 show a physical diagram of the provided gyroscope, using the following notation:
18. An optical fiber or a waveguide
19. Microwave Helmholtz coils (part of the microwave antenna [11])
20. A printed circuit board
21. A capacitor on the printed circuit board forming a resonant antenna along with the coils (part of the microwave antenna [11])
22. A waveguide for the microwave antenna excitation (part of the microwave antenna [11])
23. A microstrip radiofrequency antenna FIG. 4. An NV center FIG. 5. The NV center's energy level structure FIG. 6. The triplet structure of electron spin resonance (EPR-ODMR)
Figure 3:
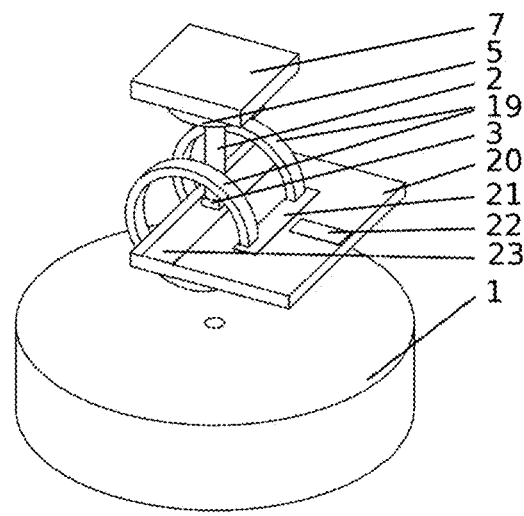

The invention provides a method for measuring absolute rotation speed of an object, based on an ensemble of NV centers in diamond, and a device for carrying out such measurements. An NV center in diamond is a defect in the diamond crystal lattice that consists of an impurity nitrogen and a vacancy.

The advantages of such a system are its reliability, as well as comparatively small size and high sensitivity. Moreover, due to some physical peculiarities of the system this method allows for measuring rotation relative to all three geometric axes with a single sensor. Another attractive feature of NV centers is their stability in a wide temperature range – from 0 to 600 K.

The method of measuring absolute rotation is based on the detection of geometric Berry phase accumulated by the nuclear spins of nitrogen-14 and carbon-13 defects in a diamond crystal lattice containing NV(−) color centers. The accumulation of the geometric phase occurs if the quantization axis (here, the axis of an NV center or that of the applied magnetic field) undergoes rotation relative to an axis that does not coincide with that quantization axis. An estimate of the measurement error for such a device lies at the level of $10^{-3}$ deg/$\sqrt{hour}$, making it superior by 1-2 orders of magnitude over similar-sized devices.

The measurement method involves the following major steps: Initialization

Bringing the system consisting of the NV centers and the surrounding nuclear spins into a rotation-sensitive state System control while in the rotation-sensitive state Rotation signal readout through measuring the accumulated geometric Berry phase The gyroscope based on NV centers comprises a diamond plate that must contain the color centers at a certain concentration. If the carbon-13 spins are employed, the diamond plate must possess an increased concentration of carbon-13. If nitrogen-14 is used, the concentration of NV centers must be high, and the concentration of carbon-13-low. The gyroscope comprises a source of green light with the wavelength in the range 500-580 nm of a laser or a photodiode type, an optical system to direct the green light onto the diamond plate, a photodetector to register fluorescence of the color centers in the diamond plate, and optical elements to direct the fluorescence from the diamond plate to the photodetector.

The invention also employs a resonant microwave antenna, a radiofrequency antenna, a source of microwave radiation, and a source of radiofrequency radiation: those are necessary in order to effectively engage the electronic and nuclear spins in the color centers. Additionally, the invention comprises a source of constant magnetic field, and a computing system for measurement control.

An Implementation of the Invention

There is provided a rotation sensor that employs measuring the accumulated geometric Berry phase by the spins in a diamond plate with large concentration of NV centers. The NV centers can reside in several charge states, namely those with q=0, q=−1, and q=+1. This invention utilizes the state with q=−1 only.

Figure 4:
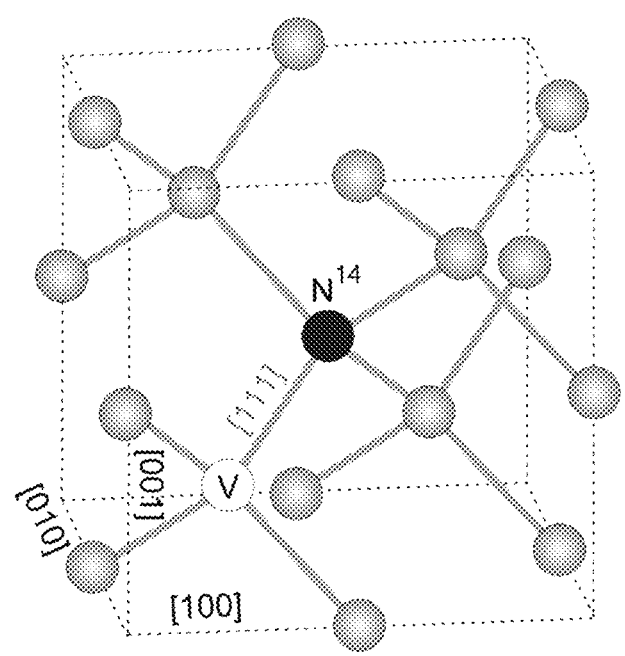
Figure 5:
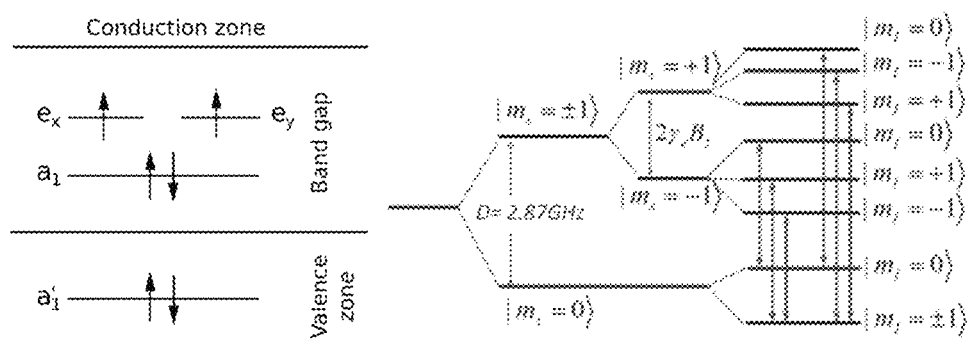

A single NV center is shown in FIG. 4. It consists of a nitrogen atom and an adjacent vacancy. An NV(−) defect has 6 free electrons with a total spin S=1. The energy levels for the electron orbitals within the diamond band gap are depicted in the FIG. 5, on the left. The energy level structure of the ground state is shown in FIG. 5, on the right.

NV centers undergo quantum transitions in the visible and the infrared parts of the electromagnetic spectrum. The main optical transition consists in the transfer of a single electron from the orbitals $e_{x,y}$ to the $a_1$ orbital and has the wavelength of 637 nm. The transition has a phonon sideband.

After a non-coherent excitation of an NV center, it decays into the ground state either through a radiative transition or via a metastable state, which does not conserve the electronic spin value and with an IR photon being emitted. The probability of decay through the metastable state depends on the NV center's electronic spin state with the maximum for the spin projection ±1 and the minimum for 0. The fluorescence intensity thus strongly depends on the spin properties of the color center, with the contrast reaching 30%, and this is used for optical readout of the system's spin state. The metastable state does not possess symmetry with respect to the spin state, which leads to spin polarization into the state with the projection 0, thus realizing optical initialization protocol for the electronic spin state. Asymmetry of the transitions in relation to electronic spin state allows to optically initialize the electronic spin.

NV centers also exhibit allowed dipole transitions in the microwave frequency range. In the ground electronic state (both electrons are on the $a_1$ sublevel), a nonzero spin-spin interaction of the electrons occurs. The latter leads to a splitting D=2.87 GHz between the states with different values of the electronic spin projection on the NV axis ($m_s=0$ and $m_s=±1$), thus inducing a fine splitting of the ground state. The degeneracy with respect to the sign of the spin projection can be resolved through application of a constant magnetic field along the NV axis.

Additionally, each of the fine-structure sub-levels exhibits a hyperfine splitting due to the interaction between the electronic spin and the nuclear spin of nitrogen-14. The hyperfine splitting in the absence of external fields, depending on the state, ranges from 2.8 to 7.2 MHz. The full Hamiltonian of the system of the electronic and nuclear spins is presented below:

$$H_{el} = DS^2 - \gamma_e B_z S_z,$$

$$H_n = H_{hf} + H_{nZ} + H_Q.$$

where the nuclear spin terms are given by the following expressions $$H_{hf} = H_F + H_{dd},$$

$$H_f = -\frac{2\mu_0}{3}\gamma_e g_n \mu_n |\psi^e_{@n}|^2 S \cdot \hat{I} = a_{iso} S \cdot \hat{I},$$

$$H_{dd} = \frac{\mu_0}{4\pi}\gamma_e g_n \mu_n \frac{S \cdot \hat{I} - 3(S \cdot e_r)(e_r \cdot \hat{I})}{r^3},$$

$$H_{nZ} = -\gamma_n B \cdot \hat{I},$$

$$H_Q = Q\hat{I}_Z^2.$$

The parameters of the Hamiltonian can be found in [L. I. Childress, "Coherent manipulation of single quantum systems in the solid state," no. March, 2007].

Figure 6:
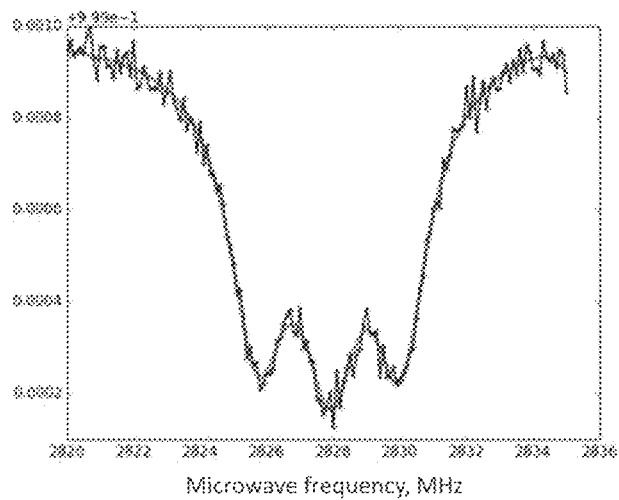
Figure 7:
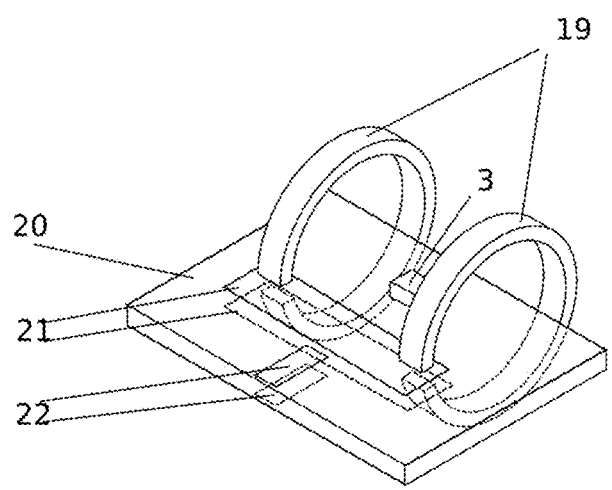
FIG. 7. A microwave antenna for addressing NV centers' magnetic sublevels

The natural linewidth of the microwave transition with the frequency 2.87 GHz approximately equals 100-200 kHz, while the distance between the different spin states is 2.1 MHz, causing an observable triplet splitting in the EPR and ODMR spectra for the electronic spin projections of 0 and 1 (FIG. 6).

However, when dealing with an NV centers ensemble, such factors as the tension in the diamond crystal, carbon-13 impurities, and spatially non-uniform magnetic fields may result in strong inhomogeneous broadening of the microwave transitions, thus degrading the performance of the gyroscope.

Diamond hosts with a moderate concentration of NV centers (1-100 ppm) are optimal for use in the proposed device. It can employ the diamonds synthesized with the HPHT technology without the use of a catalyst, the diamonds synthesized with the CVD technology with a controllable moderate nitrogen impurity concentration in the absence of other impurities (such as carbon-13), and also natural diamonds. To create an ensemble of NV centers in a diamond crystal, irradiation by an electron, proton, neutron, or helium beam is applied, with the particle energy in excess of 1 MeV. After the irradiation, the diamond sample is treated with heat in a vacuum, high-temperature oven. The annealing regimes may vary. For instance, annealing at 800° C. for 2 hours may be applied. During the annealing process, the vacancies become mobile and find nitrogen impurities in the diamond lattice to form NV centers.

A diamond plate can be polished along various crystallographic axes. The commercially available diamonds possess an [100], [110], or [111] orientation. For example, the [100] orientation occurs when the polished face of a crystal is perpendicular to a cube edge of the face-centered diamond lattice. The [111] orientation signifies that a normal to the face is parallel to the covalent bond of the lattice (see FIG. 4). For effective interaction of the electron spin with a microwave field to occur, the alternating magnetic field must be perpendicular to the NV center's axis. To achieve that, a microwave resonator depicted in FIG. 6 is used. The microwave resonator must be frequency-tunable, so that it could be used with different transitions, e.g. $m_s=−1→0$ or $m_s=+1→0$.

The rotation measurement technique based on the nuclear spin of nitrogen.

The provided measurement technique involves registering geometric Berry phase accumulated by the quantum angular momentum of the system when its quantization axis undergoes rotation. In the present case, the phase is accumulated between the states with the spin projections ±1 and 0 if nitrogen-14 is used or between those with the spin projections +1/2 and −1/2 in case of carbon-13 or nitrogen-15 (which also are impurities in the diamond lattice).

Rotation measurements can also be carried out on the basis of electronic spin, however due to the higher gyromagnetic ratio of the electronic spin it is strongly affected by external magnetic field fluctuations, making such measurements more difficult to perform.

To realize the above measurement, it is prescribed to prepare a coherent superposition of the nuclear spin states, e.g. those with the spin projections of 0 and 1, subsequently letting the system precess freely for a certain time t, and finally reading out its nuclear spin state.

Step 1. Preparation of a Coherent Nuclear Spin State

As a first step, initialization of the nuclear spin state of NV-centers is required. To achieve it, a sequence of pulses—at microwave, radio, and optical frequencies—is used that brings the system in a state with a certain projection of the nuclear spin. This sequence may vary—in particular, an optimal control algorithm can be used (e.g., the GRAPE algorithm) to take into account uncontrollable influence of the environment. The simplest way of initializing the nuclear spin is to apply the pulses consecutively, and to use the selection rules illustrated in FIG. 5. The beginning of the sequence is optical initialization of the electronic spin to the state with MS=0 and a uniform distribution of MI. Subsequently, application of a microwave R-pulse transfers the population from the MS=0, MI=1 state to the MS=+1, MI=1 state. Then an RF pulse is applied at the frequency of the MI=1→MI=0 transition, followed by an optical pulse, which excite the system, and, as a result of mainly spin-preserving optical transitions, the system returns to the state with MS=0, but already to the state of nuclear spin with the projections equal to MI=0 and MI=−1 (MI=1 has already been transferred to MI=0). A similar procedure is carried out for the nuclear spin with the projection MI=−1: as a result of this procedure, the nuclear spin is polarized to the state with MI=0.

To bring the initialized spin state to that of a coherent superposition, a $\pi/2$ pulse is applied at the nuclear spin transition frequency. This transition can take place in the state with MS=±1 as well as in the state with MS=0.

Step 2. System Control During Measurements

During the process of geometric phase accumulation, various radio-frequency pulses can be applied to the nuclear spin, aimed at filtering out external noise and exemplified by the Echo, XY4, and CPMG sequences. In addition, to reduce the effect of temperature drift and the influence of external magnetic field, it is necessary to perform the measurements on the MS=0→MS=−1 and MS=0→MS=1 transitions of the electronic spin, as well as to measure the magnetic field using the same diamond crystal [G. de Lange, D. Risté, V. V Dobrovitski, and R. Hanson, "Single-spin magnetometry with multipulse sensing sequences.," Phys. Rev. Lett., Vol. 106, no. 8, p. 080802, February 2011].

A phase accumulated between the eigenstates of a slowly evolving quantum Hamiltonian is called the Berry phase. In the case of rotation of the quantization axis of a system around an axis Z inclined at an arbitrary angle $\theta$ relative to the quantization axis, a phase accumulation occurs dependent on the value of $\theta$. This dependence is determined by the specific type of the system and by the readout method.

Figure 8:
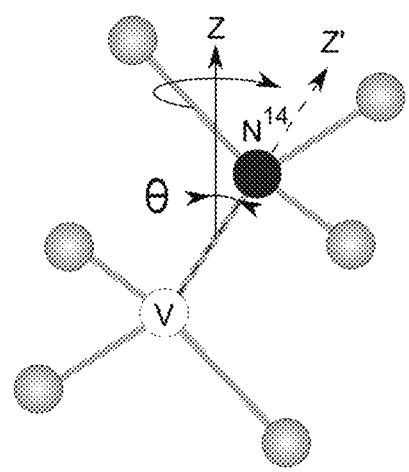
FIG. 8. Rotation of an NV center: the solid line is the rotation axis, the dashed line is the NV center's axis.

If the system under consideration is initialized into a coherent-superposition state, and the diamond crystal subsequently undergoes rotation, then relative to the dynamic phase associated with the rotation, the geometric phase will accumulate. When measuring a phase gain by applying the Ramsey spectroscopy techniques, this additional accumulated phase manifests itself in the form of a shift of the fluorescence signal relative to that of a "non-rotating" measurement (FIG. 8). Apart from that, if one performs a Fourier transform on the Ramsey signal with a detuned frequency (Free Induction Decay), the geometric phase will produce a shift in the central frequency of the signal.

In addition to Ramsey spectroscopy measurements, it is possible to carry out more complex experiments, in particular, those involving refocusing. A general consideration behind using a refocusing sequence is that the environment (unwanted paramagnetic impurities and their spins) changes slowly on the scale of a single measurement time. However, to obtain a sufficiently high signal level, it is necessary to carry out a series of similar experiments. As measurements are repeated, the environment begins to change, affecting the measured value. Yet, if it is possible to compensate for the influence of the environment in the course of one measurement, then after averaging the results of multiple measurements, the influence of the environment will be excluded. This can be realized in the framework of slowly (on the time scale of a single measurement) varying environment approximation. The simplest example is the Echo sequence, or flipping the spin over in the middle of a phase accumulation process. Given that the source of phase accumulation is constant, a reversal of the spin leads to the accumulation of a similar phase with an opposite sign, and, as a result, the accumulated "noise phase" is cancelled out.

Step 3. Measuring the spin state after free precession

After the accumulation of a phase difference between the states with MI=0 and MI=1, application of a R/2 pulse at the MI=0→MI=1 transition frequency translates the accumulated phase difference into a population difference. The latter must subsequently be converted into a measurable signal. For NV-centers, this signal is optical fluorescence produced by optical pumping in the 500-600 nm wavelength range.

Figure 9:
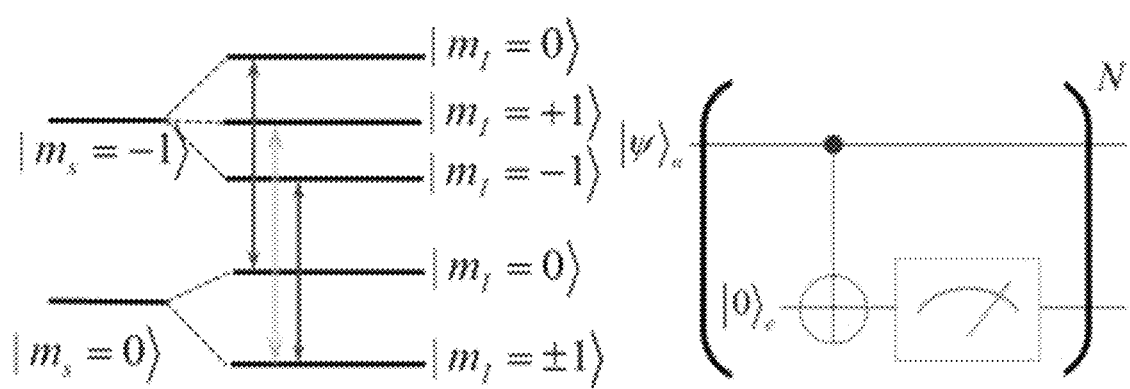
FIG. 9. The transitions used for nuclear spin state readout, and CNOT quantum gate

The fluorescence signal strength depends linearly on the populations of the electronic spin states since optical transitions are asymmetric for different states of the electronic spin. Thus, for the spin state with MS=±1 there exists a probability of a transition to the "dark" metastable state, in which case the fluorescence level falls off. To measure the nuclear spin, it is necessary to project its state onto that of the electronic spin. To achieve that, the "single-shot" readout method is applied. Its main advantage is that it allows for reading the nuclear spin state without destroying it. The principle of this projection method can be described as follows (FIG. 9). The allowed dipole transitions are those in the course of which the total spin change does not exceed 1. Accordingly, the transitions between the electronic sublevels that preserve the projection of the nuclear spin are allowed. However, the fact of transition of the system to the state with MS=1 manifests itself in a decrease in the fluorescence of the system. Thus, applying a n pulse at the frequency of one of the transitions (FIG. 9) to the system with MS=0 (after a preceding optical initialization of the electronic spin), and then observing the fluorescence, one can determine the state of the nuclear spin of the system. If it is in the MI=+1 state, then the pulse will transfer the system to the state with MS=0, MI=+1, and the fluorescence of the system will decrease. In other cases, the fluorescence of the system will not change.

The invention claimed is:

1. A gyroscope based on NV-centers in a diamond, comprising a diamond plate, a source of a green light, an optical system for directing the green light onto the diamond plate, a photodetector for registering fluorescence of the NV-centers in the diamond plate, optical elements directing the fluorescence from the diamond plate to the photodetector, a source of super-high-frequency radiation, a source of radio frequency radiation, and a source of constant magnetic field, wherein the gyroscope additionally comprises an energy-efficient antenna for microwaves that creates a strong longitudinal homogeneous microwave field in the entire volume of the diamond, is configured to provide a frequency adjustment of said microwave field, and configured to have a system for coupling the frequency of said microwave field to a frequency of the transition in the NV centers.

2. The gyroscope according to claim 1, wherein the diamond plate contains the NV-centers at a concentration in the range of 1-100 ppm, a nitrogen with a concentration that is not higher than 5 times that of the NV centers, and other impurities with concentration of below 1 ppm.

3. The gyroscope according to claim 1, wherein the source of green light is of a laser or a photodiode type and generates light with the wavelength in the range 500-580 nm and has the power of at least 0.1 W; the optical system for directing the green light onto the diamond plate generates a pump power density of at least 10 W/mm$^2$; and the photodetector operates in the wavelength range of 600-800 nm, has the operating bandwidth of at least 6 MHz, and provides the output signal-to-noise ratio of at least 60 dB.

4. The gyroscope according to claim 3, wherein the source of super-high-frequency radiation has the frequency range of 2.6-3 GHz and is configured to be modulated in amplitude and frequency; the energy-efficient antenna for microwaves produces a magnetic field of at least 0.3 GS in strength directed along the diamond surface and with the field uniformity exceeding 90%.

5. The gyroscope according to claim 4, wherein the source of radio frequency radiation generates a frequency of up to 10 MHz.

6. The gyroscope according to claim 5, wherein the source of constant magnetic field generates a constant field of up to 20 G in strength with a temperature stability exceeding 1 degree/hour.

7. The gyroscope according to claim 6, wherein it comprises a control scheme that provides control signal sequences for the source of super-high-frequency radiation, the source of radio frequency radiation and the optical system, provides the means for fields frequency tuning, and generates a feedback loop to exclude extraneous external components from the control signal sequences.

8. The gyroscope according to claim 7, wherein the optical elements provide a fluorescence collection efficiency exceeding 50%.

9. A method for measuring a rotation angle of a quantum sensor that comprises a diamond plate implanted with an ensemble of NV centers, said method comprises the following steps:
   a. bringing the NV centers ensemble and surrounding nuclear spins into a rotation-sensitive state through N>1 cycles of population transfer from the states with the projection of the nuclear spin MI=±1 to those with MI=0, where each cycle includes the following sequence of pulses:
      i. an optical pulse with the duration from 300 to 1500 ns to transfer the NV centers ensemble and surrounding nuclear spins into the state with MS=0, and a uniform distribution among MI=1, −1, and 0,
      ii. a microwave π pulse to switch the system from the state with MS=0, MI=1 to the state with MS=+1, MI=1,
      iii. a radiofrequency π pulse to transfer the system from the state with MS=+1, MI=1 to the state with MS=+1, MI=0,
      iv. an optical pulse of incoherent excitation with the duration 300-1500 ns and the wavelength of 532 nm which preserves the nuclear spin state in the presence of an external magnetic field and transfers the system into the state with MS=0, MI=−1,
      v. repeating steps ii-iv for the system in the state MS=0, MI=−1,
      vi. repeating steps ii-v N times, where N is in the range 1−5000
   b. controlling the system during the rotation measurements, which includes the use of RF pulses to filter out external noise, reducing the influence of temperature and external magnetic field by measuring the electronic spin transitions with MS=−1 and MS=1, as well as measuring the magnetic field with a help of the diamond plate;
   c. reading out an information about rotation by measuring the geometric Berry phase accumulated during rotation measurements, including the following steps:
      i. application of a radiofrequency π/2 pulse at the frequency detuned by dF* from the hyperfine splitting frequency,
      ii. measurement of the nuclear spin state by application of the CNOT gate to the electronic spin-nuclear spin system, for example, through the use of a microwave π/2 pulse at the electronic resonance frequency modified by the value of the hyperfine splitting,
      iii. measurement of the fluorescence response intensity.

10. The method according to claim 9, wherein the rotation angle, as dependent on the magnitude of the fluorescence response is determined by the formula S(w)=1+R cos(A*F(Θ)), where F is a function of the angle between the rotation axis and the NV-center axis.

11. The method according to claim 10, wherein the function F is a trigonometric Cos, Sin function.

* * * * *